Patented Nov. 24, 1942

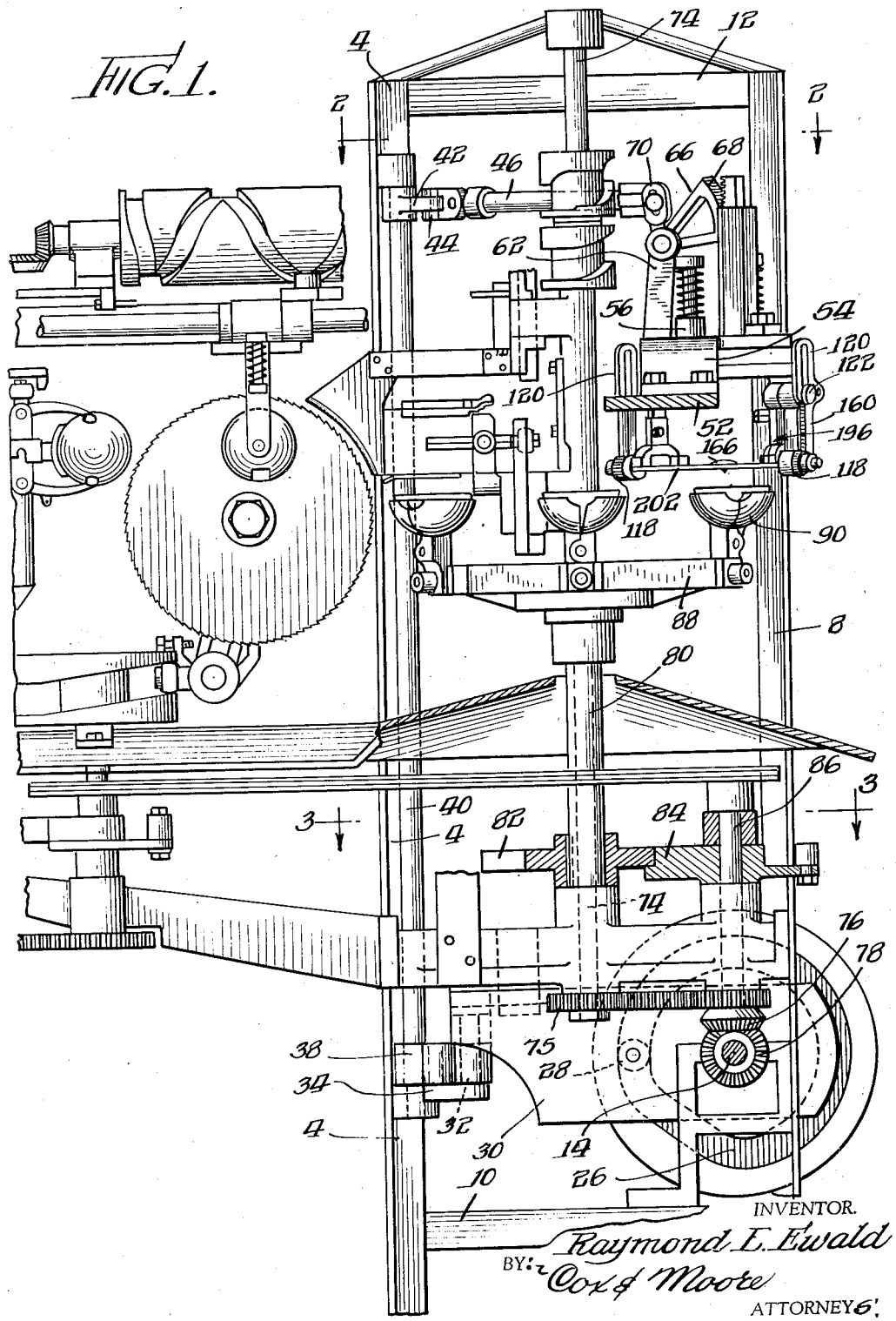

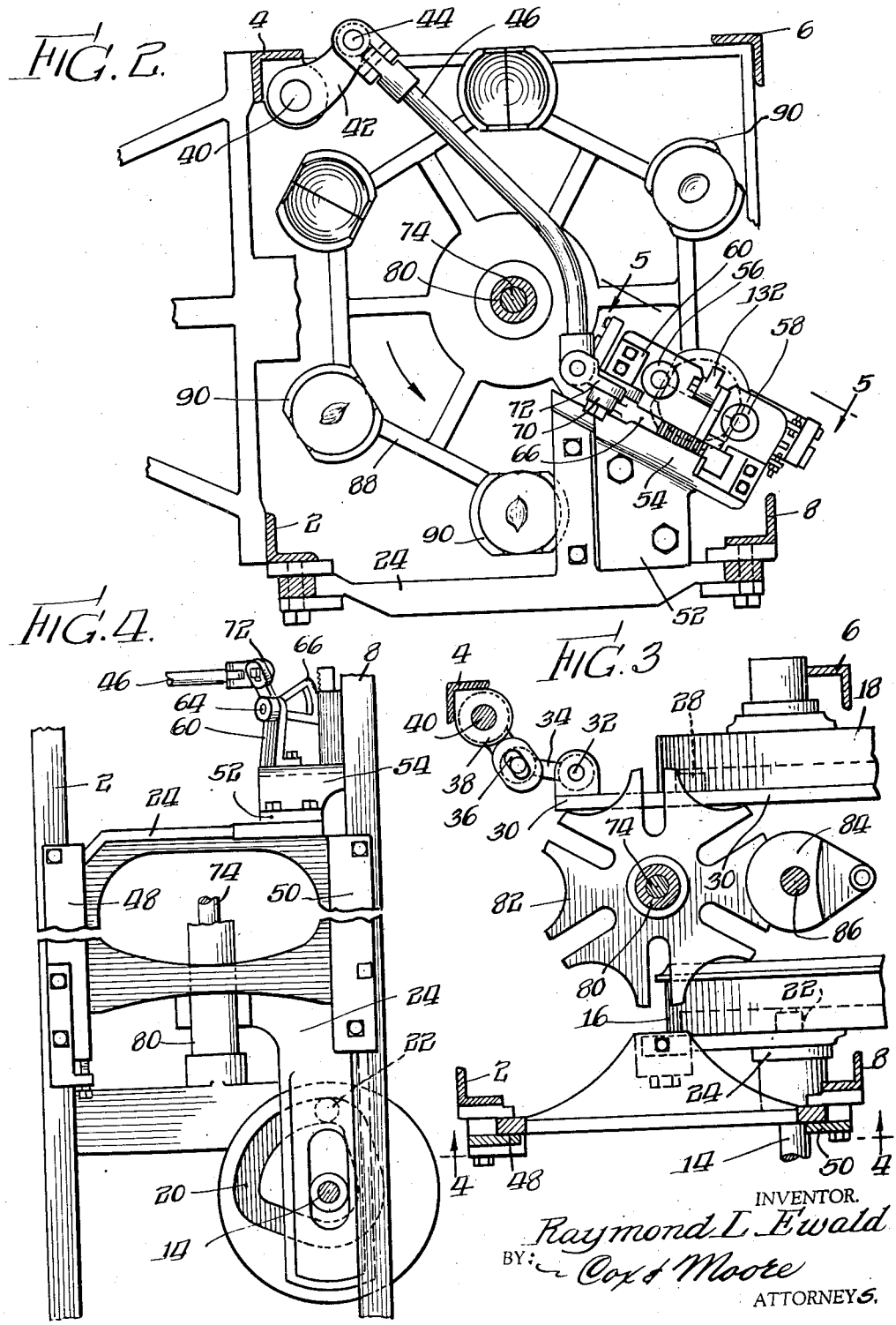

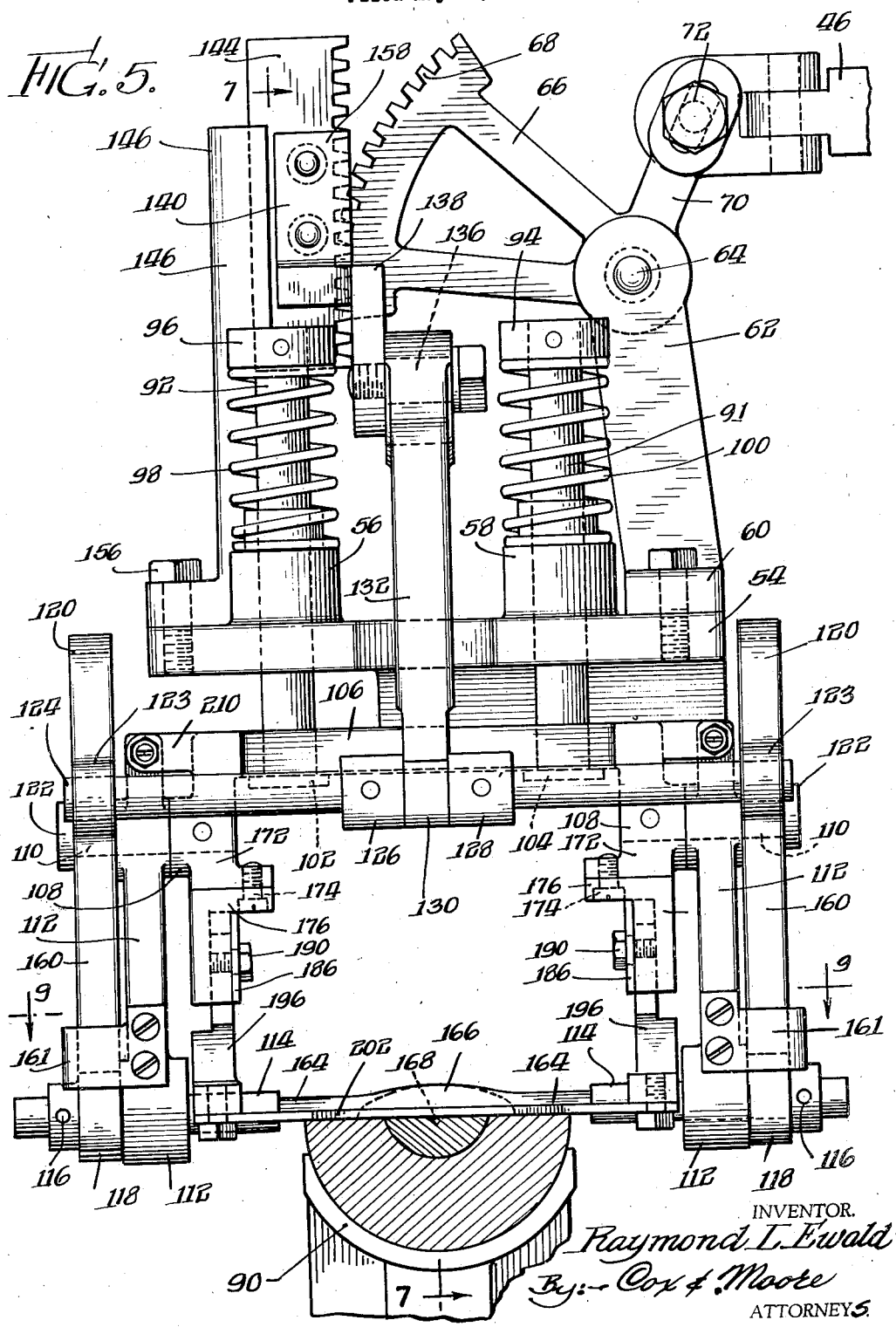

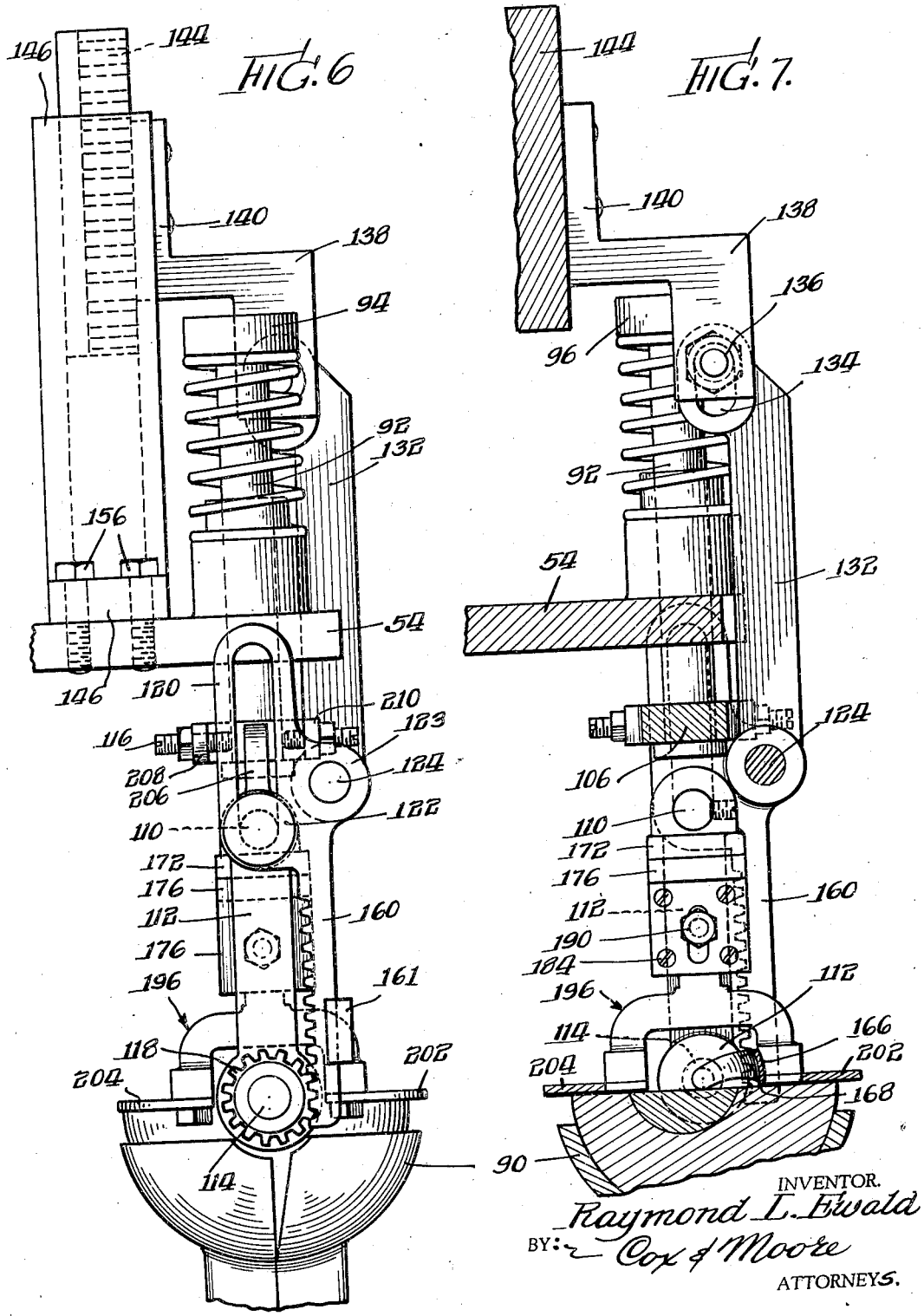

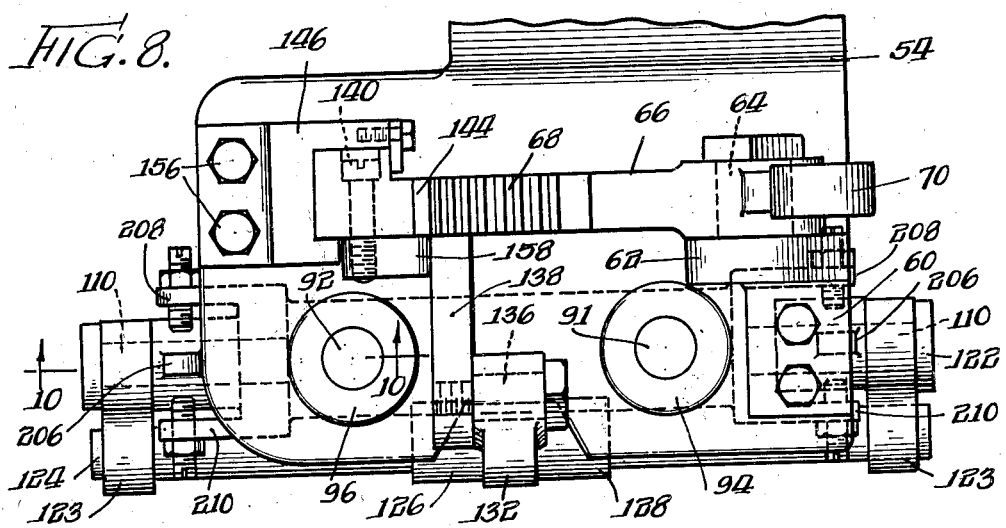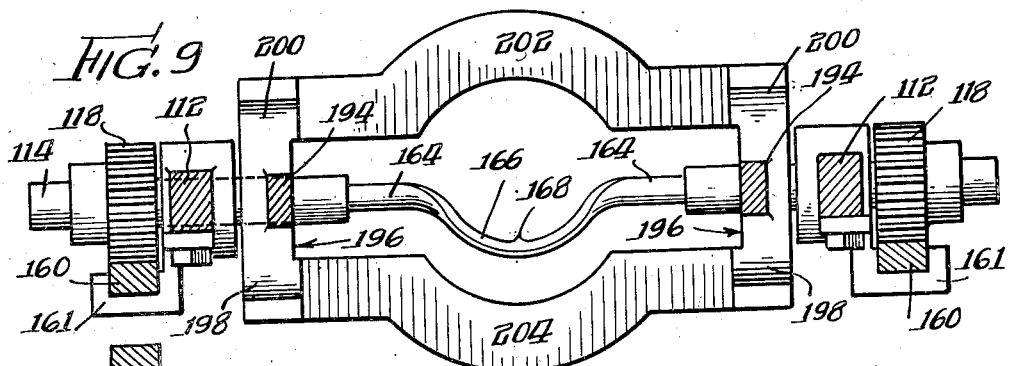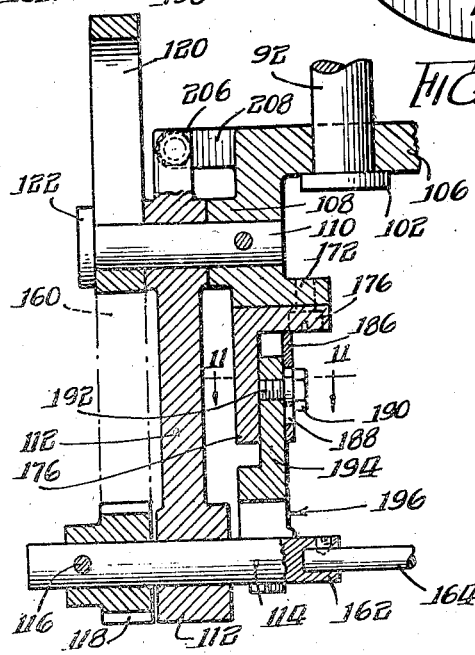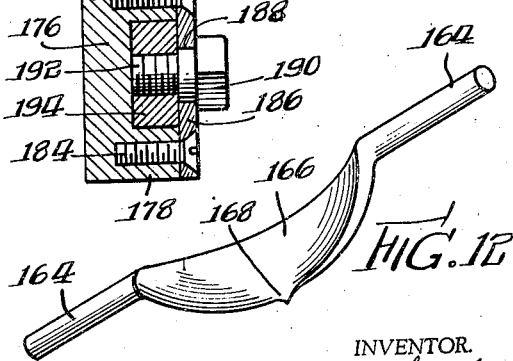

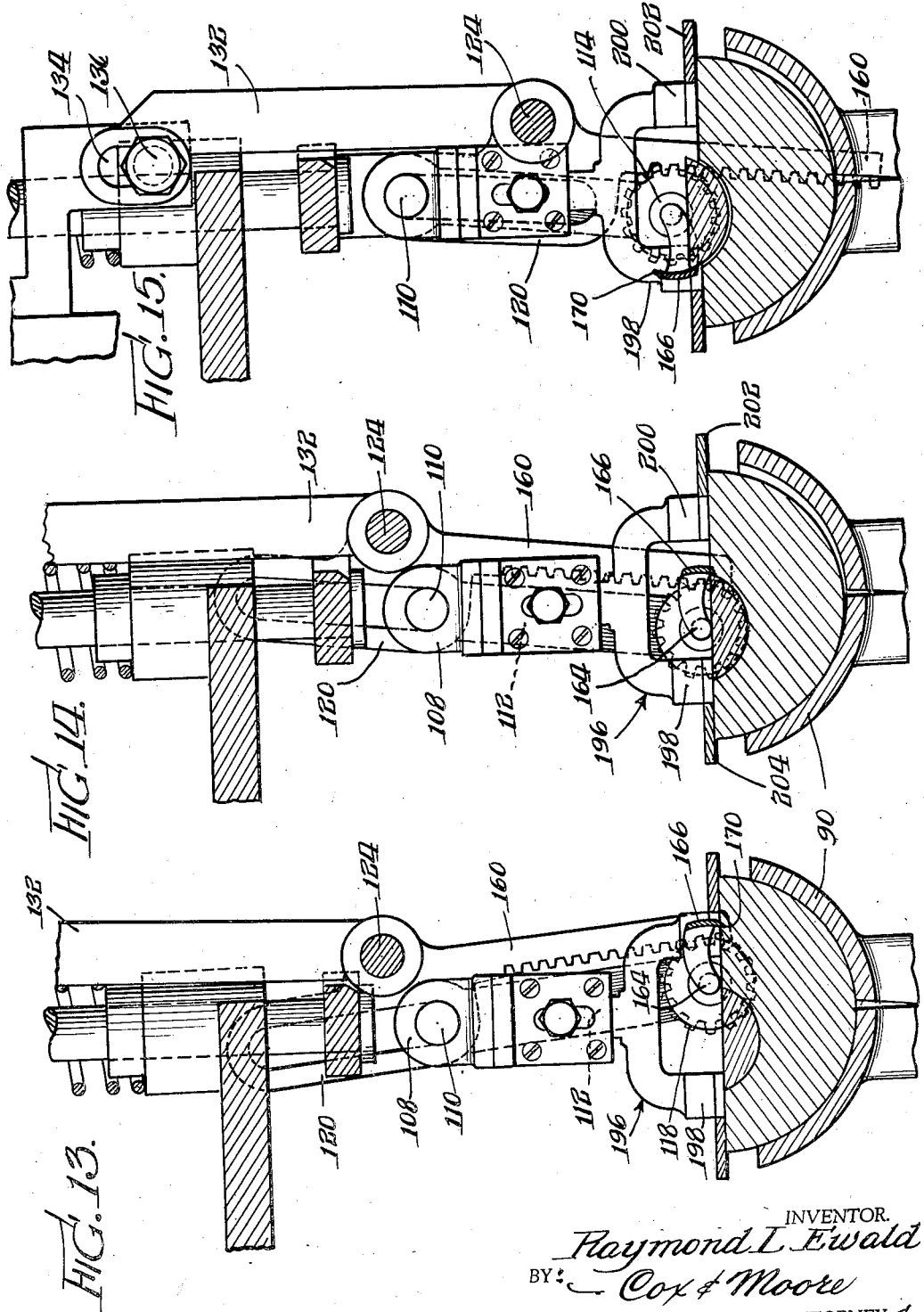

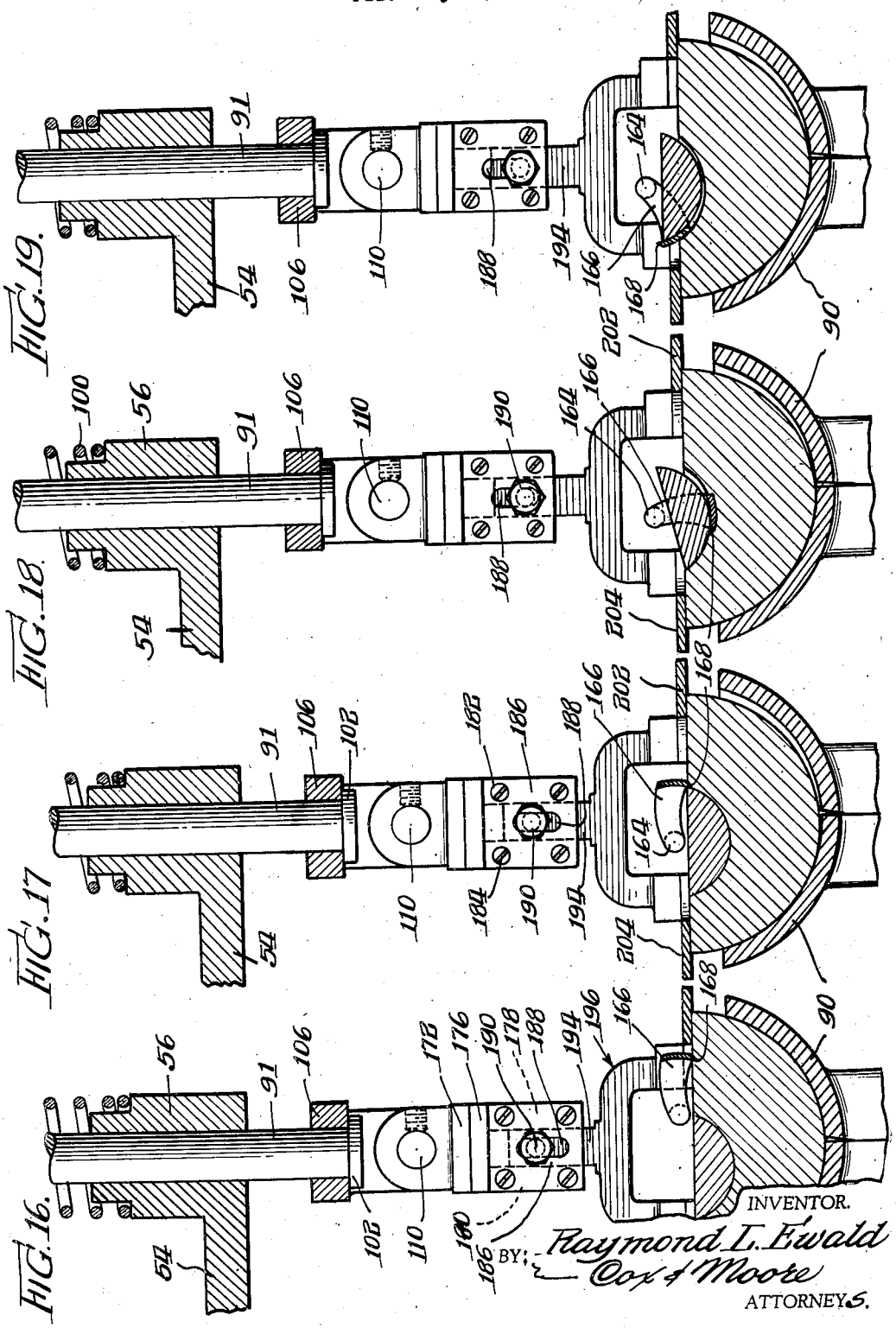

2,302,688

UNITED STATES PATENT OFFICE 2,302,688

APPARATUS FOR AND METHOD OF PROCESSING FRUIT

Raymond L. Ewald, Olympia, Wash., assignor to Special Equipment Company, Portland, Oreg., a corporation of Oregon Application May 27, 1939, Serial No. 276,057

37 Claims. (Cl. 146—28)

This invention relates to mechanisms for pitting fruit sections having a pit or pit section embodied therein.

Among the objects of the present invention are to provide means herein disclosed specifically as an organized power-operated machine, for pitting a fruit section such, for instance, as a half peach, particularly of the cling-stone variety, wherein a single pitting cutter is positioned at the cut face of the fruit section and generally removed or spaced from the edge of the pit and wherein the pitting blade is given a lateral movement substantially parallel to the cut face of the fruit and across the same and into contact with the edge of the pit and thereafter is given an arcuate movement in a manner to form an arcuate cut through the flesh of the fruit of approximately 180 degrees more or less, while at the same time, during a portion of the arcuate movement, relative opposed movements between the pitter and the flesh of the fruit are produced whereby to cause the pitting blade during its flesh severing action to make a more shallow cut and thus remove the minimum amount of flesh from the fruit segment; to provide a device, and particularly a power-operated automatic pitting device, for fruit sections having a pit or pit section embedded therein wherein a single pitting blade is given a lateral pit-finding movement relatively to the cut face of the half fruit whereby to position the blade at the edge of and into contact with the pit section and thereafter is given a continuous arcuate movement around and about the pit while, in addition, a relative movement between the blade and the flesh of the fruit section is produced tending to cause the blade closely to follow the curved contour of the pit; to provide a pitting device for pitting fruit sections having the pit section embodied therein, such, for instance, as a half cling-stone peach, wherein means is provided to contact with the cut face of the fruit section on opposite sides of the pit in such a manner as to provide a space between the contacting portions sufficiently large to accommodate the positioning of a single pitting blade combined with means for positioning the blade at the cut face of the half fruit and spaced from the margin of the pit whereby to accommodate successive fruit sections having their pits varyingly disposed or embedded therein, and wherein the pitting blade is first given a lateral pit-locating movement which substantially does not involve a flesh cutting action but which positions the blade into contact with the edge of the pit, and wherein the blade, after such contact, then moves continuously around the curved contour of the embedded pit to sever the same, means being provided acting during the arcuate movement of the blade and through contact with the cut face of the flesh of the fruit to prevent the fruit segment from moving upwardly, while at the same time slightly raising the pitting blade whereby to cause the same to move arcuately in a path closely following the contour of the pit to sever the minimum of flesh of the fruit segment during the pitting action; to provide a simple power-actuated device for pitting fruit sections utilizing a single pitting blade and providing the same with first, a preliminary pit locating movement for contacting the edge of the pit without cutting substantially into the flesh of the half fruit and thereafter continuing the movement of the pitter blade arcuately through the flesh of the half fruit in a continuous cut whereby to sever the pit from the half fruit or fruit segment; to provide an organized machine for pitting fruit sections, including half peaches, wherein such half fruit is mounted in fruit holders, herein specifically shown as a fruit cup, and wherein power-operated means is utilized for positioning fruit holding mechanism into contact with the cut face of the half fruit while in the cup and on opposite sides and spaced from the pit section, and in such a manner to provide considerable clearance between the fruit contacting means and the pit to accommodate the positioning of the pitting mechanism and wherein power-actuated means is operated to position a single pitting blade laterally of and spaced from the pit at the cut face of the fruit section while so held, and wherein power-operated mechanism is actuated first, to produce a lateral positioning movement of the pitter blade laterally across and in contact with the cut face of the half fruit so that the edge of the blade contacts just under the edge of the pit and without substantially cutting into the flesh of the half fruit and wherein thereafter, and in a continuous manner, the single pitting blade moves arcuately around and under the embedded pit section, while at the same time a lifting action is imparted to the pitter blade while the fruit section, by reason of the holding means contacting its cut face, is relatively held stationary, thereby forming a substantially shallow arcuate pitting cut in a single arcuate movement of the pitting blade for severing the pit from the half fruit or fruit section; to provide a method for pitting fruit sections, and specifically half fruit such as half peaches, by forming a single continuous cut in one direction by moving the cutter substantially parallel to the cut face of the half fruit to contact the edge of the pit and thereafter continuously and in one direction forming a line of cut around the pit section to sever the flesh therefrom, while at the same time producing relative movements between the pit and the flesh in directions opposite to each other to form a shallow cut; to provide means for adjustably limiting the swing of the single pitting blade during the flesh severing action; to provide a simple type of construction for causing the initial lateral movement of the pitting blade to locate the edge of the pit relatively to the cut face of the half fruit and without substantially cutting the flesh of the fruit, followed by a continuous arcuate cutting movement through the flesh of the fruit around the curved contour of the pit; to provide a simple type of mechanism for providing two points of pivot for a single pitting cutter about which the same is adapted to move during a preliminary pit locating movement and a subsequent pit severing movement of the cutting blade; to provide mounting and operating means for the single pitting blade whereby to provide not only a preliminary lateral pit locating movement of the blade but also an arcuate flesh severing movement of the blade combined with an upward movement of the blade relative to the flesh of the fruit during at least a portion of the arcuate flesh severing movement of the blade; to provide these and other objects of invention as will be apparent from a perusal of the following specification when taken into consideration in connection with the accompanying drawings. The drawings are as follows:

Figure 1 is a vertical sectional view of one form of the apparatus embodying the invention herein described and claimed, it being understood that the machine illustrated is an organized machine for accomplishing a number of separate processing steps upon a fruit section in addition to the pitting operation.

Figure 2 is a planned sectional view taken on line 2—2 of Fig. 1.

Figure 3 is a planned sectional view taken on line 3—3 of Fig. 1.

Figure 4 is a fragmentary side sectional view taken on line 4—4 of Fig. 3.

Figure 5 is an enlarged front elevational view of the pitter assembly taken on line 5—5 of Fig. 2.

Figure 6 is a side elevational view of the pitter assembly as viewed in Fig. 5.

Figure 7 is a vertical sectional view of the pitter assembly taken on line 7—7 of Fig. 5.

Figure 8 is a planned view of the pitter assembly.

Figure 9 is a planned sectional view of the pitter taken on line 9—9 of Fig. 5.

Figure 10 is a vertical sectional view of the lower left hand portion of the pitter assembly as viewed in Fig. 5 and taken on line 10—10 of Fig. 8.

Figure 11 is a planned sectional view taken on line 11—11 of Fig. 10.

Figure 12 is a perspective view of one type of the single pitter blade.

Figures 13, 14 and 15 are successive views of the pitter device showing the mechanism for actuating the pitting blade.

Figures 16, 17, 18 and 19 are views showing the steps of operation for the process followed by the pitting blade during the pitting of a fruit segment such as a half fruit.

In describing the process and apparatus of the present invention, a power-operated organized machine has been shown of the character set forth and claimed in the pending application of Raymond L. Ewald and Henry A. Skog entitled Fruit treating apparatus, Serial No. 185,332, filed January 17, 1938. This particular machine has been utilized for illustrating the invention merely for purposes of exemplification and is not to be considered by way of limitation, since various other embodiments of the invention herein claimed may be utilized. For instance, the invention may be incorporated purely as a pitting device and not in combination with other steps in the processing of fruit and other adaptations may be utilized for accomplishing substantially the same result by substantially the same means in substantially the same manner, providing the same falls within the purview of the appended claims.

It is also to be understood that the invention is broadly directed to the pitting of pits or pit sections from fruit segments or fruit sections, including halves of fruit. The invention is not limited to sections of peaches, but will include any type of fruit adaptable to which the machine or method is adapted. The invention has been illustrated in connection with the pitting of half peaches or peach sections, and particularly peach segments of the cling-stone type.

In the processing of peaches for canning, the finished appearance of the peach section is of primary importance as a factor in the saleability of the article. For instance, if the peeling or pitting processing step is carried out in a manner to render the finished fruit section unsightly due to unnecessary cutting of the flesh of the fruit, and particularly if the pitting process is carried out in a manner to cut too deep a cavity from the flesh of the fruit during the pitting action or if the pitting action is carried out to form a pit cavity which does not closely conform to the cross-section of the pit removed, the finished peach section does not come up to the highest type of standard and becomes a so-called second which directly affects its price value. In the pitting of peach halves considerable difficult has been experienced in the pitting action due to the fact that in a succession of peaches the pit is practically always located differently with respect to successive peach halves. In other words, in a great number of instances the pit will be eccentrically located with respect to the center of the flesh of the half peach and, therefore, in pitting a succession of peaches in an automatic machine, or in any type of machine, it is important that the process of the machine will operate in such a manner that the minimum of flesh be severed from the peach section during the pitting action, and this applies not only to the depth of the cut being taken, but also causing the pitting action to start and also to finish at the marginal edge of the pit. One of the aspects of the present invention resides in providing, particularly in a power-operated machine for handling a succession of peaches or half peaches, means utilizing a single pitting blade, and automatic mechanism for causing the blade automatically to find the edge of the pit before the commencement of the pitting cut, and thereafter causing the blade to cut through the flesh of the fruit section following closely the rounded contour of the pit in a continuous arcuate cut and emerging on the opposite side of the pit at the cut face of the half fruit closely adjacent the pit, thereby forming a clean, shallow crater or cavity in the cut face of the half fruit during the pitting movement and with the removal of a minimum of flesh of the half fruit.

Referring now to the drawings in detail, the machine utilized for exemplifying the invention is shown as comprising any type of standard machine herein shown preferably as in the form of an upright substantially square frame comprising four corner posts or angle irons 2, 4, 6, and 8 suitably braced at the top and bottom by cross-braces 10 and 12. In addition, other hereinafter described cross bars serve as rigid braces for these upright members. In addition, extending laterally from this rectangular frame, a supplementary frame projects bolted thereto as shown in Figs. 1 and 2. This supplementary frame is utilized to support the mechanism which initially receives the fruit, the mechanism which cuts the fruit in halves and transports it to the processing mechanism, including the pitting mechanism, stationed at various points around the rectangular upright support. The upright frame hereinbefore described is provided on a relatively low level with a horizontally disposed shaft 14 which is power driven in any suitable manner, shown in the prior aforementioned application. The shaft 14 carries two main cams 16 and 18 on opposite ends thereof. The cam 16 comprises a cam track 20 in which operates a roller 22 for a vertically reciprocable slide 24 for raising and lowering the main pitter carrying slide hereinafter described. In addition, cam 18 has a track 26 in which operates a roller 28 carried to a horizontally reciprocating slide 30 which has a pivotal connection 32 to a link 34 having a slotted, pivoted connection 36 to a crank 38 on a vertical shaft 40 for oscillating the latter shaft. This shaft is shown in Fig. 2 as disposed in one of the corners of the machine and has on its upper end another crank 42 pivotally connected as at 44 to a long arm 46 for operating a sector hereinafter described for actuating the pitter blade. Vertically reciprocable slide 24 has a horizontal rearwardly extending flange 52 bolted thereto and this flange is provided with an upstanding bracket 54, which bracket has two spaced apart apertured bosses 56 and 58 on its top and also has an additional spaced apart bracket 60 on which is mounted an arm 62 having in its upper end a pivot 64 for a rack sector 66, the teeth of the rack being shown at 68. This rack has in turn an operating arm 70 having an adjustable connection 72 to the oscillatory arm 46 hereinbefore described.

Vertically extending centrally between the four upright corner posts 2, 4, 6 and 8 is a vertical shaft 74 (see Figs. 1, 2, 3 and 4) carrying a gear 75 thereon which, by suitable gearing, is driven from a bevel gear 76 meshing with gear 78 on the horizontal power-driven shaft 14. Surrounding the vertical shaft 74 is a sleeve 80 fixedly carrying the slotted member 82 of a Geneva gear. The other member 84 of the Geneva gear is mounted on a shaft 86 so that from the continuous rotation of the power driven shaft 14 the sleeve 80 is intermittently driven through the Geneva mechanism 82 and 84. The sleeve 80 carries on its upper end a turret 88, preferably of spider-like formation and carrying in spaced apart relation thereon the fruit holders 90, preferably of the construction shown in the Ewald-Skog application hereinbefore mentioned.

Inasmuch as the present invention relates only to the pitting station and pitting operation of the turret machine, the mechanism shown in Fig. 1, which is claimed in my prior application, is not more specifically described. It is sufficient to say that in such case whole peaches are fed in at one station machine, are automatically carried around in succession to a cutting mechanism which severs the peaches into halves and cutting right through the pit thereof. An additional mechanism then transports each severed half fruit with the half pit embedded therein and deposits each half fruit with its pit in a separate cup. The mechanism is timed synchronically with the rotation of the turret so that each cup comes to the station and a half peach is dumped into each of the two cups simultaneously. The turret then rotates intermittently carrying each cup with its peach segment or fruit segment thereon to the pitting station, forming the subject matter of the present invention. As shown clearly in Fig. 2, the pitting station is disposed directly over the horizontal plane of movement of the fruit cups carried on the turret so that the pitting knife is adapted to cooperate with the uppermost exposed surface of the fruit section or half peach as it is carried around in a cup or cups. Figs. 1 and 5 of the drawings show the manner in which a pitting head is mounted directly over a fruit holding cup at the pitting station. The turret moves around intermittently carrying the cups in a fixed horizontal plane to the pitting station one after another and the pitting head is adapted automatically to be positioned with respect to each cup so as to intermittently pit a succession of fruit sections as they are brought around one after another to the pitting station.

The cam track 20 and the cam 16 are designed with reference to the intermittent movement of each turret so that the vertical slide 24 carrying the pitter head in the manner shown in Fig. 4 will be properly positioned to bring the pitter head down to operative position with respect to the cut surface of a half peach or fruit section in a cup when the pit has been deposited at the pitting station. As heretofore described, the two bosses 56 and 58 are disposed on the pitter head bracket 54 and are adapted to have vertical pins 91 and 92 slidably mounted therein, each pin carrying at its upper end a cap 94 and 96 adapted to receive between it and the bosses 56 and 58 the coil springs 98 and 100 for holding the pins in uppermost position. At their bottoms each pin is provided with a flange 102 and 104 carrying a supporting frame or saddle 106. This support on opposed ends is provided with a depending bearing 108 in which are fixed opposed shafts 110 constituting an upper pivot hereinafter set forth. These spaced pivots 110 have their central axes in registration. Dependingly mounted on each shaft 110 are a pair of opposed vertical supporting members 112 apertured at their lower ends to receive a pair of lower pitting shafts 114. The outer end of each of said shafts has pinned thereto as at 116 a pinion 118. Guidingly mounted on the upper end of each shaft 118 is a slotted guide 120. The outer end of each shaft 118 is provided with a flanged cap 122 which overlies the slot in the guidway 120 to hold the same in position. The slotted guideway is provided with a laterally offset portion 123 in which is fixedly mounted a second horizontal shaft 124 to the central portion of which are fixed two collars 126 and 128 between which is pivoted as at 130 the lower end of a link 132. The upper portion of this link is provided with an elongated slot 134 having an adjustable pin connection 136 with an arm 138, rigidly mounted as at 140, on a rack 144 guidingly mounted in a bracket 146 on the vertically reciprocating head 54. The bolts 156 mount the upstanding arm 148 on the head 54. The rack 146 carries on its face a vertically spaced plate 158 forming a guide for the vertically oscillatory teeth 68 of the tooth sector 66 whereby upon vertical oscillation of this tooth sector the rack will be vertically reciprocated whereby to vertically reciprocate the combined guide 128 and its interval depending rack 160. The teeth of this rack are constantly in mesh with the teeth of the pinion 118 on the pitter shaft by means of a holding bracket 161. The inner end of the pitter shaft 114 is suitably formed as at 162 to rigidly connect thereto each end of the pitter blade 164. The central portion of the pitter is shown as formed at 166. In general it is curved to conform to the outlines of the particular stone of the fruit to be pitted. The pitter shown in Fig. 12 is conformed to pit the the stones of peaches. It is preferably provided with a centrally disposed pointed tip 168 for purposes hereinafter described and is of considerable width so that as the front cutting edge 170 thereof passes through the peach the width of the blade will underlie a considerable area of the pit for the purposes hereinafter set forth. Each end of the depending saddle 106 is provided with a depending bracket 172 to the under side of which is bolted as at 174 a flanged bracket 176 having vertical spaced apart portions 178 and 180 to which are bolted as at 182 and 184 a face plate 186 carrying a vertical slot 188 therein through which passes an adjusting bolt 190, the inner end of which 192 engages into an aperture in a tongue 194 of a yoke 196. This yoke has spaced apart arms 198 and 200, each of which has formed therewith a fruit contacting member 202 and 204 adapted to be positioned into contact with the cut face of the half fruit on opposite sides of the pit and considerably spaced therefrom as shown clearly in Fig. 9. The pitter shaft 164 passes diametrically across the opening formed by these plate-like members 202 and 204. Mounted upon the upper end of the arm 112 is an upstanding contacting member 206 which is adapted to be positioned between bracket members 208 and 210 carried on the stationary portion support 106. Adjusting screws carried by these members 208 and 210 are provided so that the swing of the pitter blade may adjustably be determined.

In the operation of the single bladed pitter, when a cup has been brought by rotation of the turret to the pitting station, synchronically therewith the pitter head had been lowered to a position such that the fruit holding members 202 and 204 have been lowered on to the cut face of the half fruit on opposite sides of the pit with a space therebetween registering with the pit. It will be noted that the members 202 and 204 are sufficiently large to accommodate the varying eccentricity of the pit with respect to the center of any particular fruit section. Simultaneously with the positioning of the fruit holding members on the cut face of the half fruit, and through the instrumentality of the oscillating toothed sector 66 and the rack 144, the link 132 will be pushed down. By reason of its pivotal connection at 124, which connection is offset with respect to the pivot 110, about which the link 120 and the rack 160 move, the pitting blade 166, which by this time will have been positioned at the cut face of the half fruit and laterally of the pit thereof, and operating within the space between the plates 202 and 204, as the link 132 continues to come down, it will first cause the slotted link 120 and the rack 160 to pivot about the shaft 110, thereby causing the pitting blade 166 to move about the axis 110 as a center, shifting the blade in a substantially horizontal path across the cut face of the half fruit until the tip 168 of the pitter blade contacts the edge of the pit. It will be noted that in this action the tip 168 will slightly penetrate the cut flesh of the fruit but that the cutting edge 170 will not penetrate the flesh of the half fruit. As soon as the tip 168 of the pitter blade contacts the edge of the pit, as shown at Figs. 14 and 17, further lateral movement of the link 120 and the rack 160 ceases. Continued downward movement of the link 132 then causes the rack 160 to move down, and, since the teeth of this rack are constantly meshing with the pinion 118, such pinion is rotated, which in turn rotates the pitter shaft and causes the pitter to begin its pitting cut. This cut takes place arcuately about the pitting shaft 164 as a center. Shortly after the pitting blade has begun its actual pitting cut, this point being somewhat between the positions shown in Figs. 17 and 18, the cam race 20 is constructed to begin the gradual ascent of the pitting head which carries the pitter blade. During this gradual ascent the pitting blade will continue its arcuate swing around the under side of the pit in the manner shown in Figs. 17 to 19. Due to the width of the pitter blade as shown in these figures, and due to the fact that the pitter blade is moving upwardly in a direction at right angles to the plane of the cut face of the half fruit with the head which carries it, and due to the further fact that the fruit holding plates 202 and 204 loosely slide in the slot 188 and thereby, due to the weight of these plates, tend to hold the peach down in the cup, the flesh of the fruit section will remain in position, whereas the pitter blade, as it moves around, will positively lift the pit upwardly with a force tending to separate the pit from the flesh of the half fruit while the blade is moving therethrough, and thereby the pitting blade will follow closely the curved outlines of the pit and will form a shallow cut or cavity in the cut face of the half fruit.

It will be noted that, due to the action of the springs 98 and 100, when the pitter head comes down these springs will cushion the downward movement of the holding plates 202 and 204 on the cut face of the half fruit. It will also be noted that by reason of the tongue 194 the blade loosely fitting in the slot in the depending bracket 176 gives the plates 202 and 204 a floating means independent of the mounting or head 106.

In Fig. 15 the fruit has been shown as pushed to one side of the cup by the pit finding movement, the pitting blade entering under the pit and the pressure plates 202 and 204 holding the fruit down in the cup. At the position shown in dotted lines in Fig. 17 the assembly starts to raise during the movement of the pitting blade. This raising movement causes the cutting edge of the pitting blade to follow closely to the under side of the pit, as shown in Fig. 18. As the raising movement takes place, the tongue 194 slides in its slot, keeping the pressure plates 202 and 204 in contact with the cut surface of the fruit. As the pitting blade emerges from under the pit, as shown in Fig. 19, the stop screw 190 reaches the bottom of the slot 188 in the plate 178, hence the pressure plates 202 and 204 will thereafter raise with the entire assembly.

In the present invention the cups and the pitting station are preferably open to full concentric position so as to be sufficiently large to permit the peach or fruit section to shift slightly within the pitting movement. However, it is within the contemplation of this invention to have the cup half hold the outside contour of the fruit section and thus prevent it from moving laterally. In fact, any type of fruit holder is within the contemplation of the invention.

Numerous changes may be made in the form, construction and arrangement of the parts without departing from the spirit of the invention or sacrificing any of its attendant advantages, and the right is hereby reserved to make all such changes as fairly fall within the scope of the following claims.

The invention claimed is as follows:

1. In a device for pitting drupaceous fruit, the combination of means for supporting a fruit section with its cut face and pit exposed, a single pitting blade having a cutting edge substantially conforming to the half contour of the pit section and having an arcuate surface extending in a direction substantially transverse to the first-mentioned line of curvature of the cutter, means for positioning the cutter laterally of the pit section at the cut face of the fruit and is spaced relation from the border line of the pit section, means for causing said cutting member slightly to penetrate the flesh of the fruit and for moving laterally along the cut face of the half fruit into contact with the outer wall of the pit section while so penetrating the flesh of the fruit, and means for thereafter causing said cutting member to move arcuately in a single direction around the curved surface of the pit section to cut the flesh of the fruit at the juncture of the pit section, said pitting blade emerging from the flesh of the fruit on the opposite side of the pit section, whereby completely to sever the pit from the fruit segment.

2. In a device for pitting drupaceous fruit, the combination of means for supporting a fruit section with its cut face and pit exposed, a single pitting blade having a cutting edge substantially conforming to the half contour of the pit section and having an arcuate surface extending in a direction substantially transverse to the first-mentioned line of curvature of the cutter, means for positioning the cutter laterally of the pit section at the cut face of the fruit and in spaced relation from the border line of the pit section, means for causing said cutting member slightly to penetrate the flesh of the fruit and for moving laterally along the cut face of the half fruit into contact with the outer wall of the pit section while so penetrating the flesh of the fruit, means for thereafter causing said cutting member to move arcuately in a single direction around the curved surface of the pit section to cut the flesh of the fruit at the juncture of the pit section, said pitting blade emerging from the flesh of the fruit on the opposite side of the pit section, whereby completely to sever the pit from the fruit segment, and means for relatively forcing the pit section and flesh apart during at least a portion of the movement of the pitting blade through the flesh of the fruit whereby to maintain the cutting member in embracing relation to the side of the pit throughout such operation of the cutting means.

3. In a device for pitting drupaceous fruit, the combination of means for supporting a half fruit with its cut face and pit exposed, a single pitting blade having a curved cutting edge conforming substantially to the curve of the pit section, said blade having a pitter shaft about which the blade is adapted to turn, means for positioning said pitting blade laterally of the pit at the cut face of the fruit with a portion of the cutting edge slightly in contact with the flesh of the fruit and spaced from the border line of the pit, and mechanism relatively moving said pitter shaft and half fruit in planes parallel to the plane of the cut face of the half fruit to position said blade into contact with the pit section and for thereafter arcuately moving said blade about said shaft as an axis to cause said blade to cut through the flesh of the fruit substantially along the curved outline of the pit section.

4. In a device for pitting drupaceous fruit, the combination of means for supporting a half fruit with its cut face and pit exposed, pitting means comprising a single cutting blade, means for mounting the pitting means to cause the same to enter the cut face of the half fruit substantially at right angles thereto and slightly to penetrate the cut face of the fruit at a point spaced laterally from the border line of the pit, means for shifting the pitting means to cause the same to move directly toward the pit substantially parallel to the cut face of the half fruit whereby to engage the pit walls thereby to cause said engagement to act as a fulcrum, and means for thereafter swinging the pitting means arcuately through the flesh of the fruit and around the outer walls of the pit to sever the pit from the fruit section.

5. A method of pitting a half fruit or fruit section comprising supporting the fruit section with its cut face and pit exposed, forming a single line of cut in the cut face of the half fruit in a direction substantially parallel to the cut face of the fruit starting at a point removed from the border line of the pit at the cut face of the half fruit and terminating at the edge of the pit at a point slightly beneath the cut face of the pit and thereafter continuing the formation of the cut by an arcuate line of severance from such margin of the pit around the under side of the pit, said line of severance emerging into the cut face of the half fruit at the opposite side of the pit.

6. A method of pitting a half fruit or fruit section comprising supporting the fruit section with its cut face and pit exposed, forming a relatively narrow superficial cut in the cut face of the half fruit in a direction substantially parallel to the cut face of the fruit beginning at a point removed from the border line of the half fruit and ending at a point in contact with the pit and slightly beneath the cut face of the pit and thereafter arcuately moving the pitting blade in a continuous line of severance from such margin of the pit around the under side of the pit, said line of severance emerging into the cut face of the half fruit at the opposite side of the pit, while forcing the flesh of the fruit and the pit relatively apart during at least a portion of the formation of said line of severance.

7. The method of pitting a half fruit having a pit disposed on its cut face and unsevered therefrom, comprising supporting the half fruit with its cut face and its pit exposed, forming a superficial lineal cut in the cut face of the fruit for a short distance thereon substantially parallel to the cut face of the fruit and beginning at a point spaced from the curved wall of the pit, said cut extending through the flesh of the fruit in a direction to meet the nearest marginal surface of the pit, and therefrom forming a unidirectional curved line of cut completely around the under side of the surface of the pit, said line of cut extending continuously around the pit and emerging into the cut face of the fruit at and on the opposite side of the pit.

8. The method of pitting a half fruit having a pit disposed on its cut face and unsevered therefrom, comprising supporting the half fruit with its cut face and its pit exposed, forming a superficial lineal cut in the cut face of the fruit for a short distance thereon substantially parallel to the cut face of the fruit and beginning at a point spaced from the curved wall of the pit, said cut extending through the flesh of the fruit in a single direction to meet the outer marginal surface of the pit, and therefrom forming a curved line of cut completely around the under side of the surface of the pit, said line of cut extending continuously around the pit and emerging into the cut face of the fruit at and on the opposite side of the pit, and exerting pressure on the flesh of and at the cut face of the fruit on opposite sides of the pit and spaced therefrom an in a direction relatively away from the pit during the formation of at least a portion of the cut around the under side of the pit.

9. In a device for pitting a half fruit having a pit section disposed on its cut face and unsevered therefrom, comprising means for supporting the half fruit with its cut face and pit section exposed, a single cutter having a cutter edge conforming to the elongated curvature of the pit, said cutting edge having at least one forwardly projecting cutting point substantially centrally disposed thereof, means for advancing the cutter substantially at right angles to cause the point to cut into the cut face of the half fruit at a distance from the margin of the pit, means for then moving the cutting edge, with the point extending into the flesh of the fruit, substantially parallel to the cut face of the fruit into contact with the edge of the pit with the point slightly under the cut face of the fruit, and means for moving the cutter along the curved under surface of the pit and around the entire pit in a single line of severance whereby to sever the pit from the flesh of the fruit.

10. In a device of the class described, the combination of means for holding a half fruit with its cut face exposed, said cut face having a pit section likewise exposed and unsevered from the flesh of the half fruit, a single pitting cutter having a curvilinear cutting edge substantially conforming to a curved wall of the pit, means for positioning the cutter substantially at the cut face of the half fruit in spaced relation from the marginal wall of the pit, means imparting a preliminary adjusting movement of the cutter from such first position so as to bring the cutter laterally into contact with the wall of the pit without substantially penetrating the flesh of the half fruit at the cut face, and means for thereafter swinging the cutter about an axis relatively close to the cut face of the half fruit to cause the cutter to follow closely the marginal wall of the pit in severing the flesh of the half fruit from the pit.

11. In a device for pitting a half fruit or fruit section having a pit unsevered therefrom, means comprising a support for the fruit section with its cut face and pit exposed, cutting means comprising a single cutter having curved cutting edges and walls conforming to curved walls of the pit, means for positioning the cutter at the cut face of the half fruit or fruit section, means for moving the cutter to cut the flesh of the half fruit beginning at one side of the pit at the cut surface and continuing in a single direction following around the curved wall of the pit and emerging at the cut face on the opposite side of the pit whereby the pit is completely severed, means for causing said cutter bodily to shift outwardly in a direction substantially at right angles to the plane of the face of the half fruit during at least a part of its arcuate cutting movement whereby to tend to shift the pit away from the half fruit, and means for exerting a pressure substantially in the opposite direction against the exposed face of the flesh of the half fruit on opposite sides of the pit during such outward movement of the cutter.

12. In a device for pitting drupaceous fruit, the combination of means for supporting a half fruit with its cut face and pit exposed, pitting means comprising a pitter shaft having a single cutting blade having a cutting edge conforming substantially to the curve of the pit section, means for positioning said pitter shaft and cutting blade at the face of the fruit at one side of the pit section with said cutting edge adjacent the flesh of the fruit in slightly spaced relation from the border line of the pit, mechanism for operating said cutting member including means to move the pitter shaft relatively to the half fruit and substantially parallel to the cut face of the half fruit to move the cutting edge of the blade into contact with the pit section and whereby to shift said half fruit laterally and means for thereafter moving said cutting member to cause it to cut through the flesh of the fruit to sever the pit section therefrom.

13. In a device for pitting fruit sections or half fruit, comprising means for holding the half fruit or fruit section with its cut face and pit exposed, a pitter head, means for causing relative approaching and receding movement between the pitter head and the fruit holder, said pitting head including means forming an upper pivotal axis, a slotted link pivotally mounted on said axial means, said means passing through the slot thereof, said slotted means having a lateral projection, said lateral projection being located above said pivotal point, means connecting the said lateral projection for raising and lowering said slotted arm relatively to said fruit holder, said lateral projection having at one side of the extension of said slotted arm an elongated tooth rack, a supporting arm pivotally mounted on said first-mentioned pivot, said arm carrying a pin or shaft spaced from said first mentioned means forming a pivotal axis, a pinion mounted on said second shaft, said pinion having teeth engaging with the teeth of said rack, a pitter knife oscillatingly carried by said second-mentioned shaft for rotation about the axis thereof, said pitter having a curved cutting edge conforming to the longitudinal curvature of the pit to be severed.

14. In a device for pitting a half fruit, the combination of means for holding the half fruit, a pitter head, power means for shifting the pitter head from the fruit holder, means forming vertically spaced apart pivots on said pitter head, said lower pivotal means carrying a pinion thereon, the upper pivotal means having a rack vertically slidable with respect thereto, said rack having teeth engaging the teeth of the pinion on the lower pivotal means, said rack having a guide adapted to engage said upper pivotal means, said rack having a second pivotal connection laterally opposite in a vertical direction from said upper pivotal means, power actuated means for raising and lowering said rack, a pitter knife mounted upon said lower pivotal means, a depending arm carried by said pitter head, a relatively flat fruit holding means adapted to contact the cut face of the half fruit along opposite sides of the pit in spaced relation therefrom, and means forming a lost motion connection between said fruit holding means and said pitter head.

15. In a device of the class described, the combination of means for holding a half fruit with the cut face and pit exposed, a pitter head, fruit holding means vertically slidable with respect to said pitter head and adapted to contact the cut face of the half fruit on opposite sides of the pit in spaced relation therefrom, a single pitting knife mounted on said pitter head and adapted to be positioned in the space between said fruit contacting means, power operated means for raising and lowering said head and said fruit pitting knife with respect to said fruit holder and for moving said knife in the space between the fruit holding means from a position laterally of the pit at the cut face of the half fruit into contact with the edge of the pit and for thereafter rotating said pitting knife in a single direction to cause said knife arcuately to move at least one hundred eighty degrees through the flesh of the fruit around the under side of the contour of the pit to sever the pit from the flesh of the half fruit.

16. In a device of the class described, in combination with a fruit holder adapted to receive a half fruit with the cut face and pit section exposed, a pitter head, a power operated means for raising and lowering the pitter head to and from the cut face of the half fruit, a frame resiliently depending from said pitter head, including a pair of horizontally disposed, spaced apart shafts, an arm pivotally depending from each of said shafts, a second shaft carried by each arm, a pinion on said second shaft, a pitter knife having its ends carried by each of said second shafts for rotation therewith, a slidable link straddling said upper shaft, said link being generally disposed in a vertical position, said link having a lateral offset forming a third pivot, a power actuated arm pivotally mounted to said third pivot, said link having a depending tooth rack extending downwardly from said second-mentioned pivot and constantly engaging the teeth of the pinion on said lowermost shaft, said head having a depending slideway having a vertical slot therein, an arm having a tongue, and a nut entering said tongue and passing through the walls of said slot for movement vertically of said slot, said arm having spaced apart feet and a flat plate-like member carried by each foot and adapted to be contacted with the cut face of the half fruit on opposite sides of the pit, said pitting knife operating in space between said plate-like arm.

17. The herein described apparatus comprising means for holding a half fruit with its cut face and pit exposed, a single pitter blade having a curvature corresponding to the elongated curvature of the pit, means for positioning the knife laterally of the pit and adjacent the cut face of the half fruit, means for shifting the knife laterally across and substantially parallel to the cut face of the half fruit into contact with the edge of the pit, means for thereafter arcuately moving said knife in a single direction around the under side of the pit to sever the flesh of the half fruit, said knife emerging from the flesh at the opposite margin of the pit at the cut face of the half fruit, means for lifting the knife as it passes arcuately around the under side of the pit whereby to lift the pit, and means for holding the flesh of the half fruit during the lifting movement imparted to the knife.

18. In a device of the class described, the combination of means for holding a half fruit with the cut face and pit exposed, a pitting knife having a pinion thereon for rotating the same, a rack meshing with said pinion, means for shifting said rack, and mechanism associated with said rack and with said shifting means whereby to cause said pinion and said knife to shift substantially parallel to the cut face of the half fruit without rotating said pinion, whereby to position said knife adjacent the marginal edge of the pit, said mechanism thereafter causing said pinion to rotate and said knife to rotate, said knife passing in a continuous arcuate path around the under surface of the pit to form a substantially 180 degree arcuate cut in the flesh of the half fruit.

19. In a device of the class described, the combination of means for holding a half fruit with its cut face and pit section exposed, a single pitting knife having its blade arcuately formed generally to the cross sectional curvature of the pit, the blade having substantial breadth sufficient in extent to underlie a relatively wide portion of the curved face of the pit, and means for moving the knife through the flesh of the half fruit while so held and for lifting the knife relatively to and away from the flesh of the half fruit and for holding the flesh of the fruit from such lifting movement as said blade moves arcuately through the cut flesh of the half fruit in contact with and following the marginal contour of the pit.

20. The herein described method of pitting a half fruit wherein such half fruit carries an unsevered pit section on its plane cut face, comprising holding the half fruit with its cut face exposed while arcuately moving through the flesh of the half fruit in a general direction following the marginal contour of the pit thereof, a pitting knife having a curved cutting edge substantially conforming to the curved cross sectional contour of the pit and having a breadth of sufficient dimension in the direction of the arcuate movement of the knife to enable the knife to contact a relatively broad extent of said curved surface of the pit, meanwhile, during at least a portion of the arcuate cutting movement of said knife around the pit, bodily moving the knife in a direction away from the half fruit with a force tending to separate the pit from the flesh of the half fruit, whereby the knife in its arcuate pitting movement forms a relatively shallower cut in the flesh of the half fruit.

21. The herein described method of pitting a half fruit wherein such half fruit carries an unsevered pit section on its plane cut face, comprising holding the half fruit with its cut face exposed while arcuately moving through the flesh of the half fruit in a general direction following the marginal contour of the pit thereof, a pitting knife having a curved cutting edge substantially conforming to the curved cross sectional contour of the pit and having a breadth of sufficient dimension in the direction of the arcuate movement of the knife to enable the knife to contact a relatively broad extent of said curved surface of the pit, meanwhile, during at least a portion of the arcuate cutting movement of said knife around the pit, bodily moving the knife in a direction away from the half fruit with a force tending to separate the pit from the flesh of the half fruit, and holding the flesh of the fruit from moving in the direction in which the knife is bodily moved.

22. The herein described method of pitting a half fruit wherein such half fruit carries an unsevered pit section on its plane cut face, comprising holding the half fruit with its cut face exposed while arcuately moving through the flesh of the half fruit in a general direction following the marginal contour of the pit thereof, a pitting knife having a curved cutting edge substantially conforming to the curved cross sectional contour of the pit and having a breadth of sufficient dimension in the direction of the arcuate movement of the knife to enable the knife to contact a relatively broad extent of said curved surface of the pit, meanwhile, during at least a portion of the arcuate cutting movement of said knife around the pit, bodily moving the knife in a direction away from the half fruit with a force tending to separate the pit from the flesh of the half fruit, and moving the flesh of the half fruit in a direction opposite to that in which the knife is bodily moved, whereby the knife in its arcuate pitting movement forms a relatively shallower cut in the flesh of the half fruit.

23. The herein described method of pitting a half fruit wherein such half fruit carries an unsevered pit section on its plane cut face, comprising holding the half fruit with its cut face exposed while arcuately moving through the flesh of the half fruit in a general direction following the marginal contour of the pit thereof, a pitting knife having a curved cutting edge substantially conforming to the curved cross sectional contour of the pit and having a breadth of sufficient dimension in the direction of the arcuate movement of the knife to enable the knife to contact a relatively broad extent of said curved surface of the pit, meanwhile, during at least a portion of the arcuate movement of said knife around the pit, bodily moving the knife in a direction substantially ninety degrees from the plane of the surface of the half fruit, whereby the knife in its arcuate pitting movement forms a relatively shallower cut in the flesh of the half fruit.

24. In a device for pitting half fruit or fruit section having the pit unsevered therefrom, means comprising a support for the fruit section to hold the fruit with its cut face and pit exposed, cutting means comprising a single cutter having curved cutting edges and walls conforming to the longitudinal curved walls of the pit, the cutting means having a breadth of sufficient dimension in the direction of the arcuate movement of the knife to enable the knife to contact a relatively broad extent of said surface of the cutter, means for arcuately moving the cutter to cut through the flesh of the half fruit beginning at one side of the pit at the cut surface and continuing in a single direction, following around the curved wall of the pit and emerging at the cut face on the opposite side of the pit whereby completely to sever the pit, and means operable during at least a portion of the arcuate cutting movement of said knife around said pit for bodily moving the knife in a direction away from the half fruit with a force tending to separate the pit from the flesh of the half fruit.

25. In a device for pitting half fruit or fruit section having the pit unsevered therefrom, means comprising a support for the fruit section to hold the fruit with its cut face and pit exposed, cutting means comprising a single cutter having curved cutting edges and walls conforming to the longitudinal curved walls of the pit, the cutting means having a breadth of sufficient dimension in the direction of the arcuate movement of the knife to enable the knife to contact a relatively broad extent of said surface of the cutter, means for arcuately moving the cutter to cut through the flesh of the half fruit beginning at one side of the pit at the cut surface and continuing in a single direction, following around the curved wall of the pit and emerging at the cut face on the opposite side of the pit whereby to completely sever the pit, and means operable during at least a portion of cutting movement of said knife for bodily moving the knife in a direction substantially ninety degrees from the plane of the cut face of the half fruit.

26. A device for pitting a half fruit having the pit section unsevered therefrom, means comprising a support for the half fruit adapted to hold the same with its cut face and pit exposed, means adapted to contact the cut face of the half fruit upon opposite sides of the pit section, cutting means comprising a single cutter having curved cutting edges and walls conforming to the curved walls of the pit, said pitting knife having a breadth of sufficient dimension in the direction of the arcuate movement of the knife to enable the knife to contact a relatively broad extent of said curved surface of the pit, means operable during at least a portion of the arcuate movement of said knife around the pit for bodily moving the knife in a direction away from the half fruit with a force tending to separate the pit from the flesh of the half fruit, and means operable to cause the means contacting the cut face of the half fruit on opposite sides of the pit to move in a direction opposite to that in which the knife is bodily moved.

27. In a device of the class described, the combination of means for holding a half fruit with its cut face and pit exposed, a rotary cutter shaft, a pitting knife adapted arcuately to be moved by the rotation of said shaft, means for producing relative approaching and receding movement between the cutter shaft and the cut face of the half fruit whereby to position the cutter at the cut face of the half fruit laterally removed from the marginal edge of the pit, and means adapted in the first part of its movement for shifting said cutter shaft and cutter transversely of the cut face of the half fruit whereby to position the cutter into contact with the marginal edge of the pit at the cut face of the half fruit and adapted thereafter to rotate said cutter shaft whereby arcuately to move said cutter through the flesh of the half fruit around the border line of the pit section to cut through the flesh of the half fruit.

28. In a device of the class described, the combination of means for holding a half fruit with its cut face and pit exposed, a rotary cutter shaft, a pitting knife adapted arcuately to be moved by the rotation of said shaft, means for producing relative approaching and receding movement between the cutter shaft and the cut face of the half fruit whereby to position the cutter at the cut face of the half fruit laterally removed from the marginal edge of the pit, and means adapted in the first part of its movement for shifting said cutter shaft and cutter transversely of the cut face of the half fruit whereby to position the cutter into contact with the marginal edge of the pit at the cut face of the half fruit and adapted thereafter to rotate said cutter shaft whereby to move the cutter at least one hundred eighty degrees in a continuous arcuate movement through the flesh of the half fruit to sever the pit therefrom.

29. In a device of the class described, the combination of means for holding a half fruit with its cut face and pit exposed, a pitting knife having a shaft having a pinion thereon for rotating said knife, a rack mechanism meshing with said pinion, and means for shifting said rack including mechanism to preliminarily shift said pinion transversely of the face of the half fruit and to position the knife with respect to the margin of the pit and without turning the knife and thereafter to turn said knife to cause the same to cut through the flesh of the half fruit.

30. In a device of the class described in combination with means for holding a half fruit with its cut face and pit exposed, means adapted to engage the cut flesh of the half fruit on opposite sides of the pit and to press thereon in a direction toward the flesh of the half fruit on opposite sides of the pit, pit severing means including a single arcuately shaped cutter, means for positioning said arcuate cutter at the cut face of the half fruit on one side of the half pit and for moving the cutter through the flesh of the half fruit into contact with the pit and thereafter to move the cutter in a single direction following the general curved peripheral surface of the pit, and means acting while said arcuate pitting means is located in contact with and under the curved surface of the half pit for shifting said cutting means in a direction away from the cut face of the half fruit, whereby to shift the pit away from the flesh of the half fruit.

31. In a device of the class described in combination with means for holding half fruit with its cut face and pit section exposed, flat faced means engaging the cut flesh of the half fruit on opposite sides of and spaced from the pit, means to press said flat faced means in a direction toward the half fruit holding means, shiftable cutting means to engage and follow the periphery of the pit and to sever the flesh of the half fruit in a direction following the curved surface of the pit including means for bodily shifting said cutting means in a direction away from the fruit holding means while in engagement with the pit, whereby to shift said pit outwardly away from the cut surface of the half fruit during the severing action.

32. In a device of the class described in combination with a fruit holder adapted to hold a half fruit with its pit section exposed, means adapted to engage the flesh of the half fruit on opposite sides of the pit section to prevent outward movement of the half fruit relatively to the fruit holding means, and a single relatively broad pitting knife having a concaved surface generally shaped to correspond to the arcuate shape of the pit, means for moving said knife toward and into contact with the cut surface of the half fruit to engage the margin of the pit, means for thereafter shifting said knife arcuately to pass around the curved surface of the pit in a pit severing action, and means acting when said knife is positioned beneath said pit for initiating the outward shifting of said knife away from the cut flesh of the half fruit so as to clear said knife of the half fruit, said outward movement of said knife serving to lift said pit from the half fruit.

33. In a device for pitting half fruit having a pit unsevered therefrom comprising means for supporting the half fruit with its cut face and pit exposed, said means fixedly maintaining said fruit supporting means through a pit severing operation, pitting means, means for operating the pitting means to cut partially through the flesh of the fruit beginning at one side of the pit at the cut face and arcuately continuing about a fixed axis partially around the underside of the pit, shiftable means for pressing inwardly upon the flesh of the fruit at the cut face thereof on opposite sides of the pit, and means for moving the axis about which the pitter is adapted to move, away from the cut face of the fruit during the latter part of the arcuate pit severing movement of the pitting means, whereby to force the pit away from the fruit supporting means during such portion of the severing operation.

34. In a device for pitting half fruit in combination with means for supporting a half fruit with its cut face and pit disposed uppermost, a support adapted to be shifted toward and from the supported half fruit, means shiftably mounted on said support and adapted to be brought into contact with the cut face of the half fruit on opposite sides of the pit and pressing downwardly on the flesh of the half fruit while said fruit is supported, pit severing means carried by said shiftable support, means for actuating said support to position it relatively to said support to move the pit severing means through the flesh of the fruit into contact with the pit at one side of the pit, actuable means for arcuately shifting said severing means through the flesh of the half fruit whereby to form a cut around the underside of the pit to sever the pit from the flesh of the half fruit, and means actuable during at least a portion of such arcuate pit severing movement of the severing means for moving the support and severing means away from the surface of the half fruit while leaving said pressing means in contact with the cut surface of the fruit, whereby to lift the pit relatively to the oppositely pressed flesh of the half fruit.

35. The method of pitting a half fruit which comprises supporting the half fruit with its cut face exposed, engaging a knife with the surface of the pit while moving the knife along a first arcuate path about an axis substantially concentric to one marginal edge of the pit and from said marginal edge partially under the pit, shifting the knife and pit while in engagement in a direction away from the half fruit and while holding the half fruit against movement in said direction, moving the shifting knife to the other marginal edge of the pit along a second arcuate path about an axis substantially concentric to the center under-surface portion of the pit while pressing upon the cut face of the flesh of the half fruit in a direction opposite to the direction of shifting of the knife and pit to maintain the unsevered surface portion of the pit in engagement with the knife as it moves along said second arcuate path.

36. The method of pitting a half fruit which comprises supporting the half fruit with its cut face and pit exposed, moving a knife into contact with a margin of the pit and while thus in contact, arcuately moving the knife around the curved periphery of the pit to the opposite margin of the pit to sever the pit meanwhile pressing on the flesh of the fruit on opposite sides of the pit in one direction and during a portion only of the movement of the knife while in contact with the pit shifting the knife in the opposite direction away from the cut face to tension the undercut fibers of the flesh of the fruit prior to their severance.

37. The method of pitting a half fruit which comprises supporting the half fruit with its cut face and pit exposed, moving cutting means continuously from one marginal edge of the pit to the opposite marginal edge of the pit through the flesh of the fruit while in contact with the periphery of the pit while during at least a portion of such pit severing movement exerting force both on the pit and on the cut face of said flesh of the fruit in such opposite directions as tends to cause their separation.

RAYMOND L. EWALD.

CERTIFICATE OF CORRECTION.

Patent No. 2,302,688.　　　　　　　　　　　　　　　　　November 24, 1942.

RAYMOND L. EWALD.

It is hereby certified that error appears in the printed specification of the above numbered patent requiring correction as follows: Page 2, second column, line 50-51, for "difficult" read --difficulty--; page 3, second column, line 72, for "guidway" read --guideway--; page 4, first column, line 27, strike out "the" before "stones"; page 5, first column, line 34, claim 1, for "is" read --in--; page 6, first column, line 32, claim 8, for "an" read --and--; page 10, second column, line 11, claim 37, for "the cut" read --said cut--; and same line, for "said flesh" read --the flesh--; and that the said Letters Patent should be read with this correction therein that the same may conform to the record of the case in the Patent Office.

Signed and sealed this 13th day of April, A. D. 1943.

(Seal)　　　　　　　　　　　　　　　　　　　　　　　Henry Van Arsdale,
　　　　　　　　　　　　　　　　　　　　　　　Acting Commissioner of Patents.